Jan. 22, 1963  G. ALFIERI  3,074,291
GEAR CHANGE WITH AUXILIARY PNEUMATIC SERVOCONTROL
Filed May 5, 1958  6 Sheets-Sheet 5

INVENTOR
GIUSEPPE ALFIERI

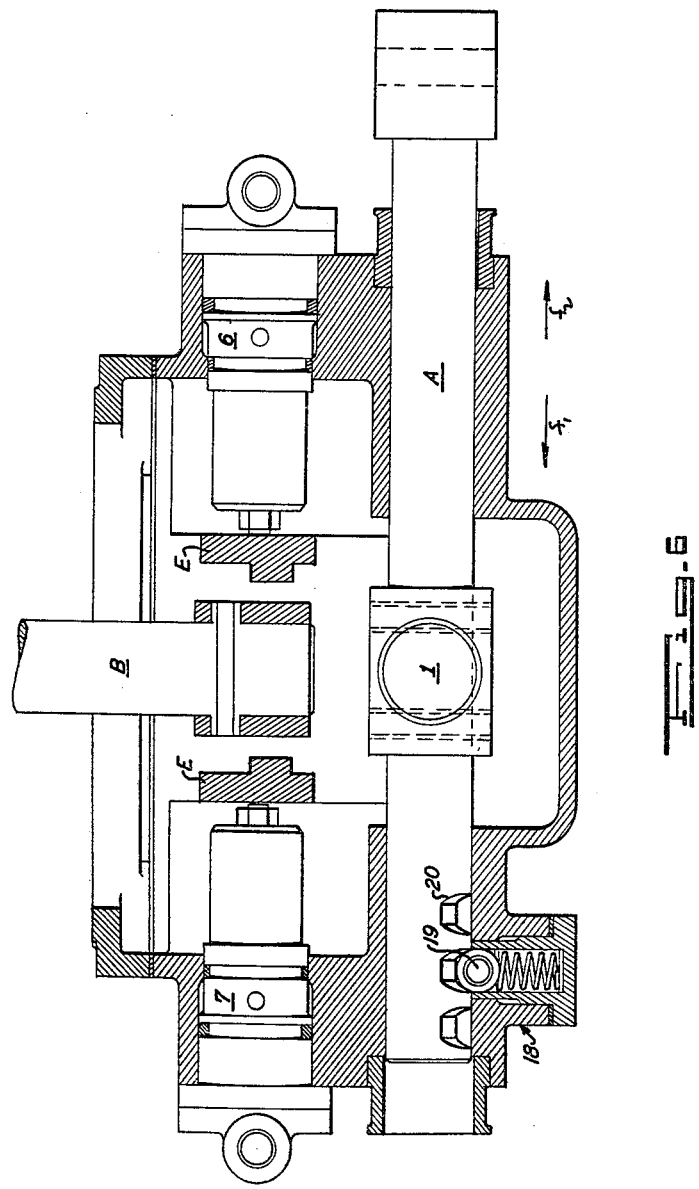

United States Patent Office 3,074,291
Patented Jan. 22, 1963

3,074,291
GEAR CHANGE WITH AUXILIARY PNEUMATIC SERVOCONTROL
Giuseppe Alfieri, Milan, Italy, assignor to Fabbrica Italiana Magneti Marelli S.p.A., Milan, Italy, a company of Italy
Filed May 5, 1958, Ser. No. 733,008
Claims priority, application Germany May 6, 1957
6 Claims. (Cl. 74—335)

The present invention relates to an improved gear changing mechanism. More particularly, the gear changing mechanism involves control operations which are augmented by an auxiliary pneumatic servocontrol.

The gear changing mechanism according to the invention includes a mechanical gear change mechanism which comprises a control lever, a first actuating control shaft operated by said lever, and a rod for the control of the gears of a transmission, said rod being connected to the control shaft through an arm and a lever coupled together with a suitable ball joint.

During operation, the control shaft is rotated and axially translated which causes respectively a translation and a rotation of the rod. This movement of the rod selects and engages the corresponding gears of the transmission.

The selection and engaging of the gears is resisted by mechanical coupling forces which may require the application of large forces on the control lever in order to actuate the same.

It is an object of the present invention to minimize the effort required on the control lever by supplementing the force exerted on the rod by the control shaft by providing a suitable pneumatic-mechanical device which is actuated in the stage of engaging or disengaging of gears and which enables shifting of the gears with a minimum effort exerted on the control lever.

It is a further object of the invention that the concomitant intervention of the pneumatic action be controlled by the movement of the control lever.

The mechanism according to the invention comprises a lever system, a double-acting cylinder and two distributors for a pressure medium, preferably compressed air and will be illustrated and described hereinafter with reference to the accompanying drawings wherein:

FIGURE 1 is a diagrammatic view of the device showing its use with a standard mechanical gear change mechanism;

FIGURE 2 diagrammatically represents an improvement in the actuating system of the device according to FIG. 1;

FIGURE 6 is a sectional view taken along the line 6—6 of FIG. 5 showing in particular a variation according to FIG. 2.

Figure 1:
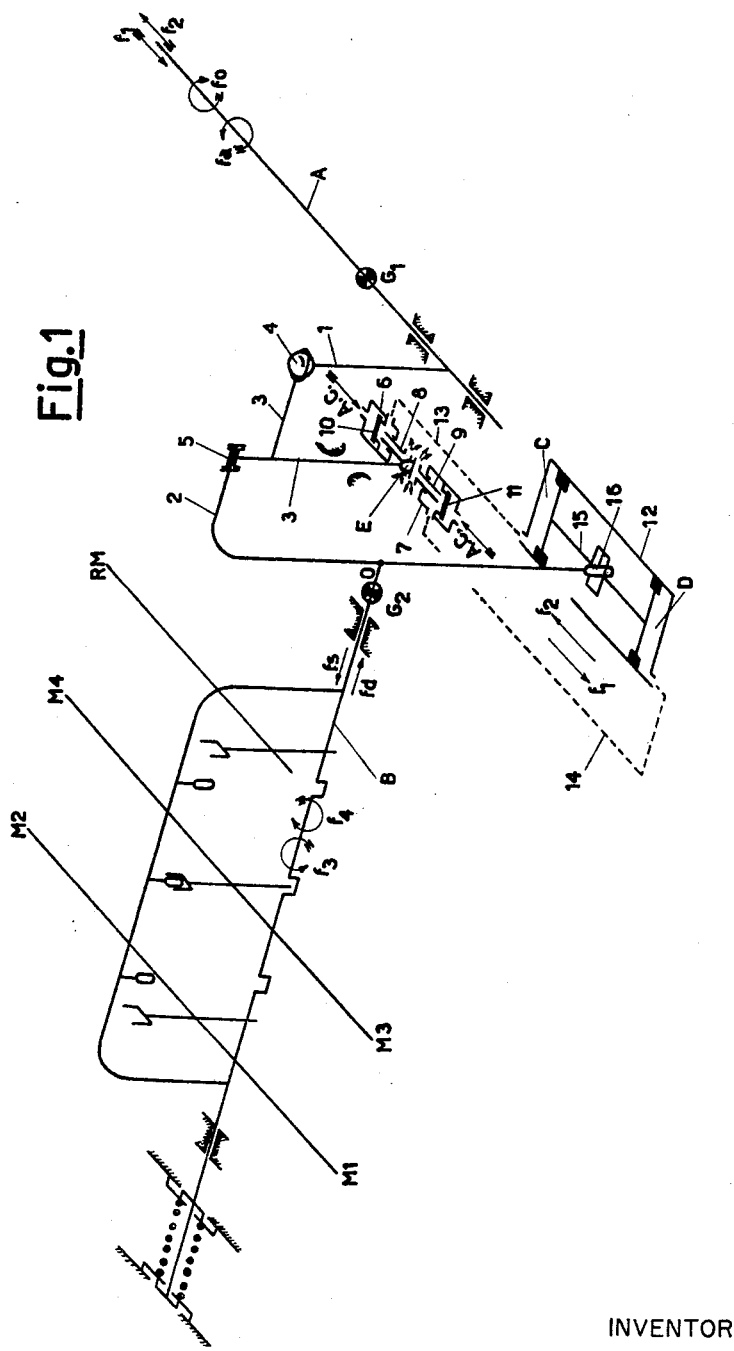

With reference to FIG. 1, control shaft A is supported for rotary and translating movement for controlling engagement of the gears of the transmission in a manner to be more fully explained hereinafter. Control rod B selects the appropriate gear of the transmission in accordance with the movement of control shaft A. Arm 1 is rigidly coupled to shaft A. A lever 2 is connected to rod B at O and to an arm 3 through hinge 5. Arm 3 is connected to arm 1 through ball joint 4.

Distributors 6 and 7, arranged to be actuated by the end E of the arm 3, are connected as indicated by the arrows A.C. with a source of supply of a pressure medium such as compressed air.

Numerals 8 and 9 represent actuating tappets for valves 10 and 11, which tappets are provided with discharge conduit. Double-acting operating cylinder 12 is provided with two chambers C and D connected respectively through the conduits 13 and 14 to the distributors 6 and 7.

In cylinder 12 is a piston 15 connected to the lever 2 by means of the joint 16.

M1, M2, M3 and M4 indicate respectively the forward speed gears while RM indicates the reverse gear. G1 and G2 represent two joints.

Operation of the improved gear change of the invention is as follows:

The gear change lever (not shown) is actuated in accordance with the desired gear change. The gear change lever controls the rotation and translation of shaft A. A rotation of shaft A causes translation of rod B and a translation of shaft A causes rotation of rod B, as can be seen from the following:

Let us suppose that in the first stage, called the selecting stage, the operator acts upon the gear change lever in such a way as to cause a clockwise rotation of the shaft A, that is, in the sense indicated by the arrow $fo$: the arm 1 rigid therewith, consequently rotates in a clockwise sense rod B which will undergo a translation in the direction of $fd$. This displacement operates the selection of the speeds in known manner.

In the above stage the servocontrol obviously does not intervene. In analogous manner, if the rotation of shaft A is counterclockwise as indicated by the arrow $fa$: the servocontrol is not operative and a translation in the direction of $fs$.

In the second stage, called the engaging stage, let us suppose instead that we have a translation of the rod A directed in the direction of the arrow $f1$. This translation tends to cause translation of joint 4 and hinge 5 in the direction of $f1$ which causes rotation about O of lever 2 in a counter-clockwise direction. This causes rotation of shaft B in a counterclockwise direction ($f3$). Consequently, translation of shaft A in direction $f1$ mechanically causes rotation of shaft B in direction $f3$. The resistance of rotation by the rod B and, therefore, by the lever 2, will cause however the rotation around the hinge 5, of the arm 3, whose lower end E will in turn actuate the tappet 9 for actuating the distributor 7 with consequent opening of the valve 11 and, therefore, cause flow of compressed air through the conduit 14 into the chamber D of the operating cylinder 12.

The action of the compressed air in D will displace the piston 15 in the direction indicated by the arrow $f2$ thereby urging the arm 2 and the rod B rigid therewith in a counterclockwise direction of rotation as indicated by the arrow $f3$ to consequently cause the engagement of the gear associated with M1 or M3 dependent upon the axial position of rod B. The invention of the servocontrol is then such that the action exerted at 16 causes a rotation of the rod B which supplements the mechanical effort applied by shaft A.

It should be noted that the rotation of B causes the displacement of the fulcrum or hinge 5 and, therefore, the displacement of E with consequent cessation of the effort on the distributor 7 and, therefore, of the auxiliary pneumatic action at 16. Said effort and said pneumatic action is maintained if the driver continues to hold shaft A in a displaced position whereby end 4 of the arm 1 is constantly loaded.

The operation of the servocontrol obviously remains the same if the rod A is displaced in the opposed sense, that is, according to the arrow $f2$. The arm 3 will rotate again around the hinge 5 but in opposed sense until end E acts upon the tappet 8 of the distributor 6 thereby opening the valve 10 to therefore cause the flow of compressed air into C through the conduit 13.

The piston 15 will then be displaced in the direction of the arrow f1 thereby causing the rotation of the arm 2 and of the rod B rigid therewith, in a clockwise sense as indicated by the arrow f4, and, therefore, the engaging of the gear corresponding with M2, M4 or RM.

Hence it appears evident how there is concomitance of the action developed by the pneumatic servocontrol with the manual action and, therefore, ease of operation of the lever of the gear change, which is not otherwise obtainable. In fact it is possible with the adoption of the pneumatic-mechanical device of the invention to obtain the engaging of the speeds by a minimum manual effort, limited to the actuation of the servocontrol only.

If instead one starts from an engaged speed, to actuate the disengagement it is necessary to effect a displacement according to f1 or f2 of the rod A with consequent concomitant intervention of the pneumatic-mechanical device according to what has been described hereinbefore for the engaging stage.

The position shown in the drawing corresponds to the idling position in which the position of selection of the gears corresponding to M3 and M4 is automatically obtained by the action of a special spring acting on rod B. Hence for the engaging of the gears corresponding to M3 and M4 no rotation of shaft A is necessary, it merely being necessary to apply a translation movement to shaft A by means of the gear change lever.

A further feature of the invention is that the gear changes may be effected in a mechanical manner if for any reason the pneumatic source becomes insufficient or if pressure fails. In that case the force exerted on the rod A transmitted to the arms 1—3—2 will initially result in displacement of the end E to act upon one of the valves of the distributor without activating however the servocontrol.

It is clear however that as soon as said end E is blocked and immovable, the force on the rod A will be transmitted through 4—5—O mechanically to the rod B.

In addition to the features already set forth it should be noted that the device between the shaft A and the rod B is easily replaceable as a unit. Hence it becomes extremely easy, by releasing the joints C1 and C2, to disconnect the arm of the mechanical transmission and the control shaft and to insert between said two joints the pneumatic-mechanical device according to the invention.

The operation is particularly facilitated by the fact that the casing containing only the mechanical components of the servo-pneumatic device are interchangeable.

Consequently it is possible quickly and simply to apply the servocontrol to standard gear changes of the mechanical type and, moreover, to provide, without variation in the structure of the transmission, a production of vehicles with interchangeable standard mechanical gear change apparatus and with pneumatic servocontrolled gear change apparatus.

Figure 2:
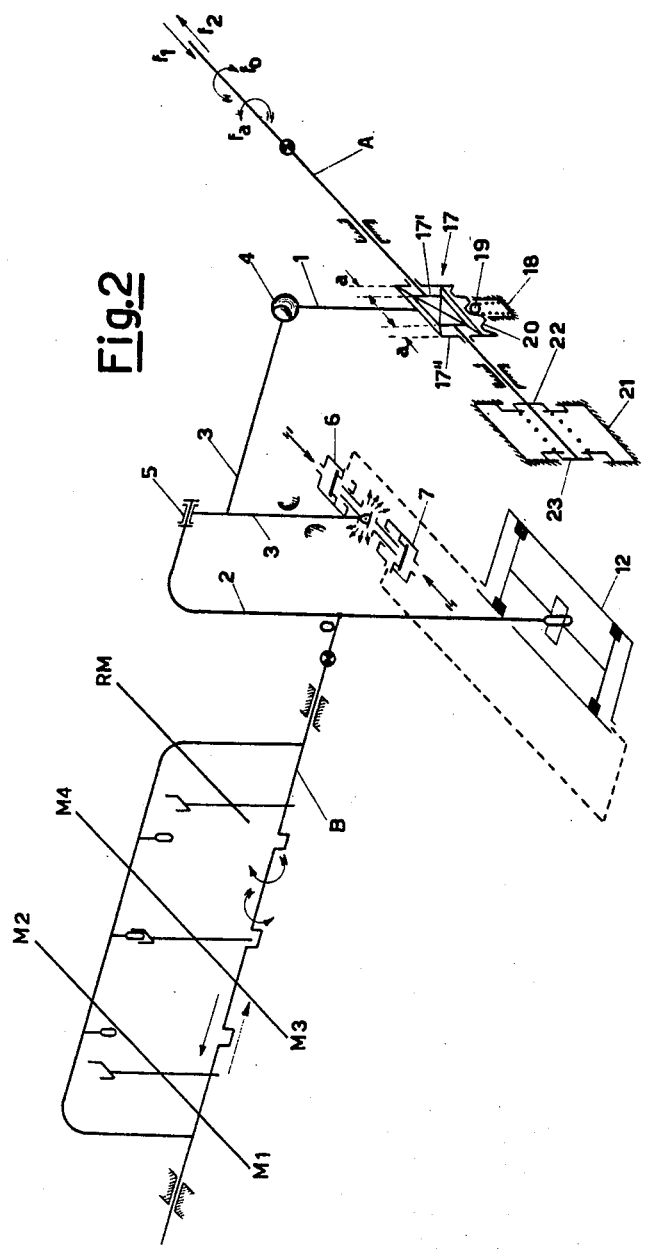
Figure 3:
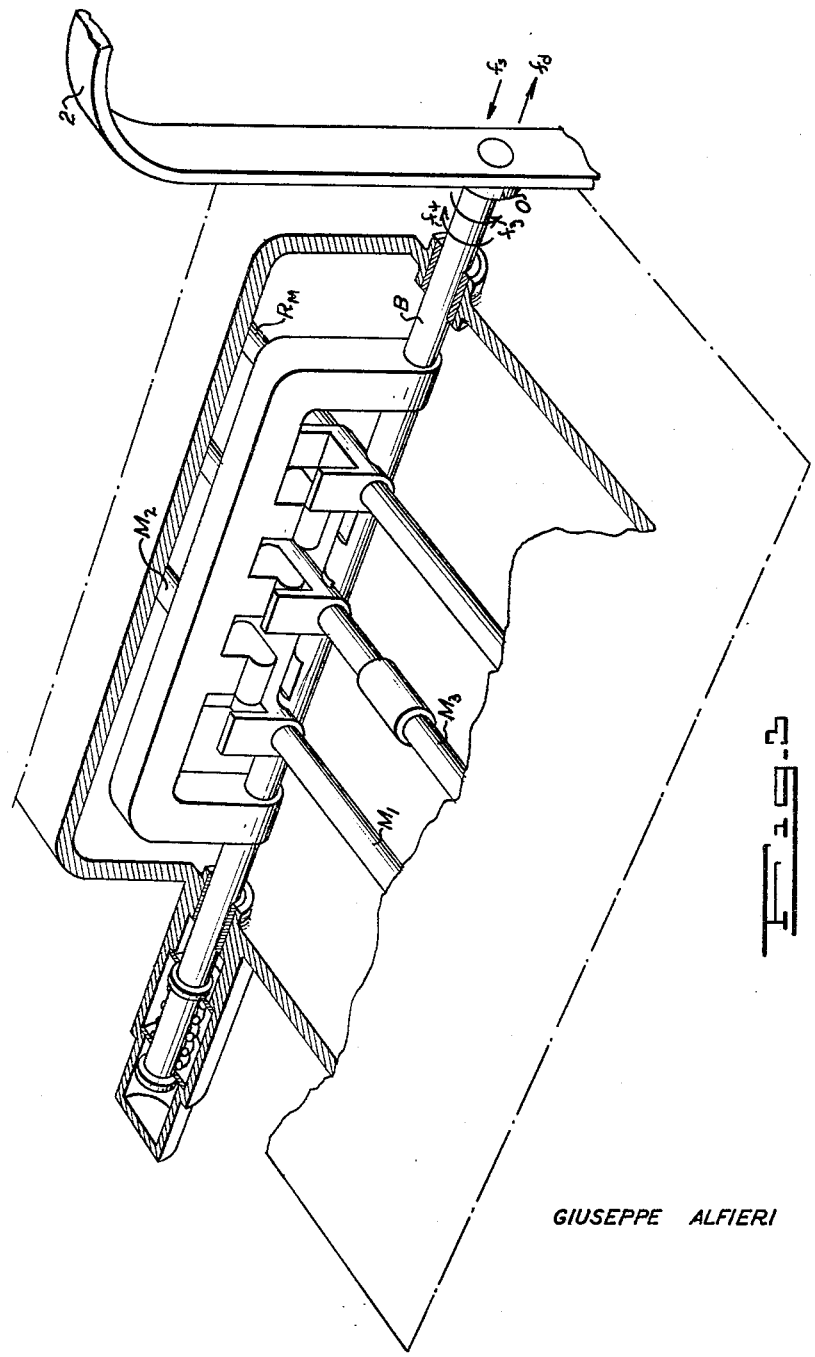
FIGURE 3 is a perspective view partially cut away of a portion of the embodiment shown in FIG. 1.
Figure 4:
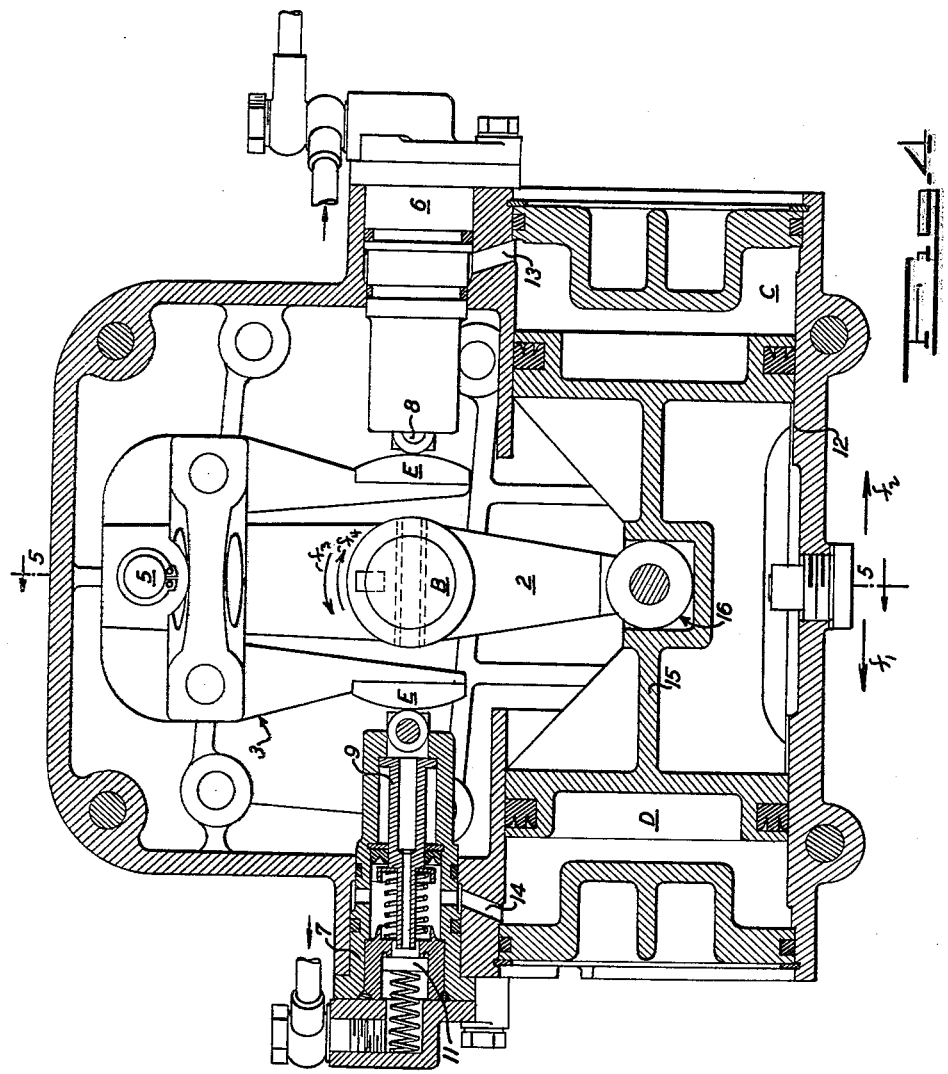
FIGURE 4 is a partial sectional view through the servocontrol which is illustrated in FIGS. 1 and 2.
Figure 5:
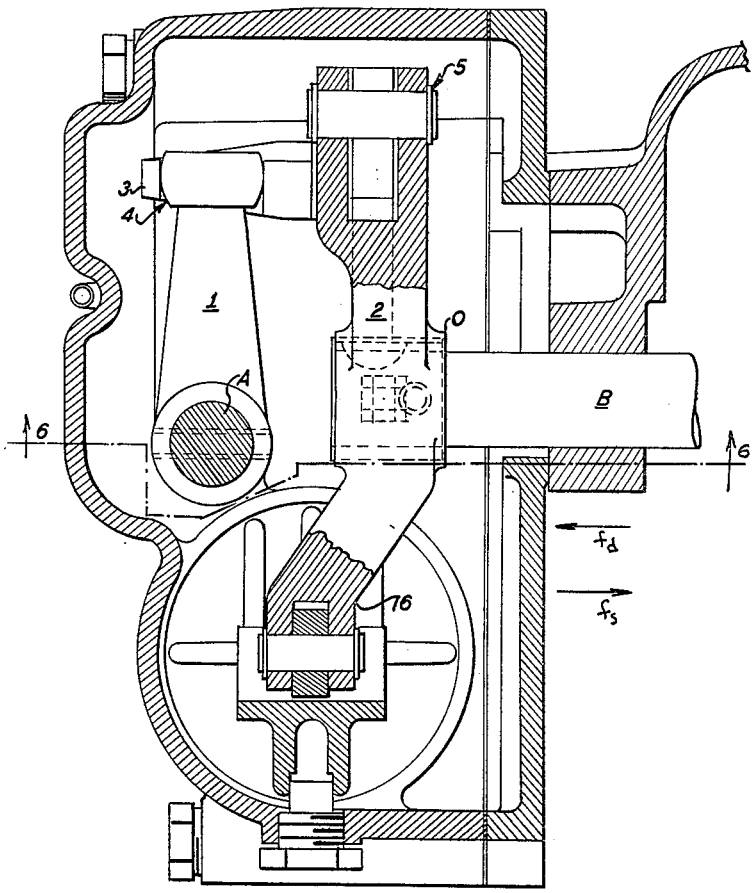
FIGURE 5 is a sectional view taken along the line 5—5 of FIG. 4.

According to the improvement shown in FIG. 2, the control shaft A (controlled by the gear change lever) and arm 1 are connected in such a way as to permit in the only stage of engaging or disengaging of speeds, a preliminary idle stroke of the control shaft A before engagement of the rod B of the transmission. The stroke is determined as a function of the mass of the elements of the transmission or of the elastic characteristics of the supports.

According to said improvement the control shaft A and the arm 1 are connected coupling 17 constituted essentially by the male element of the coupling 17' rigid with the rod A and by the external female element 17", rigid with the arm 1. The element 17' can translate in the direction f1 or f2 inside the element 17''' but it cannot rotate with respect thereto.

Accordingly, shaft A and arm 1 are slidable relative to one another but are rigidly connected for rotation together.

In the drawing the displacement between shaft A and arm 1 corresponds to the distance $a$ between 17' and 17".

The coupling 17 is completed by a positioner 18 which acts by means of the ball 19 upon the position notch 20 rigid with the element 17".

Moreover, upon the shaft A there acts axially a centering device 21 including a centering spring. The centering device is a well known expedient. It further includes having characteristics known as cups 22 and 23 fixed to said shaft A. This device automatically establishes the rest or idling position of shaft A. In the idling position the groove of the position notch 20 is centrally located as indicated in FIG. 2.

Operation of the transmission device according to FIG. 2 is as follows:

*Selection of speeds.*—Starting from an idling position, shown in the drawings, the rod A is rotated in the direction of arrow $fa$ or $fo$ according to whether engagement of the gears corresponding to M1—M2 of the reverse gear RM is desired.

The coupling 17 rotates in this stage rigid with the control rod A and transmits through 4—5—O a force to the rod B which causes axial displacement thereof. During the rotation of 17, the ball 19 of the positioner 18 remains in the cylindrical intermediate groove of the positioning notch 20.

*Engagement of speeds.*—The shaft A is subjected to an axial displacement in the direction of arrows f1 or f2, but distinct from what occurs in the operation of selection, the engagement with the lever by shaft A takes place only after an idling displacement thereof corresponding to the distance $a$ between 17' and 17". Subsequently, the entire coupling 17 is displaced by shaft A a distance sufficient to cause engagement of the particular gear of the transmission selected. In this statge the centering spring of 21 will exert an axial thrust upon shaft A and the positioner 18 on the termination of the operation will be engaged in one of the end grooves, according to whether the gears engaged corresponds to the first or third speed or to one of the three remaining gears (corresponding to second, fourth or reverse speeds).

Hence in the stage of engagement of speeds the preliminary idling stroke of the shaft A with respect to the servocontrol has a lost motion to compensate for inertia of the elements, so as to prevent untimely intervention of the servomechanism.

I claim:

1. A control device for a change gearing device comprising a control shaft axially and rotatably movable about its axis, an arm rigidly connected to said shaft and extending radially thereof, a change-gear actuating rod axially and rotatably movable about its axis and arranged perpendicularly to said shaft, a lever affixed to an end of said rod and at right angles therewith and having a bent end extending in parallel to said rod, means for connecting the bent end of said lever with said arm, a mechanism for servocontrol which mechanism is operable in parallel to the axis of said control shaft, said mechanism including valves comprising stems actuatable by said connecting means with said control shaft axially displaced, said device further comprising operative members connected to said lever and operable parallel to the axis of said control shaft, said operative members being coupled to said servocontrol mechanism for axial displacement with said valves actuated, displacement of said operative members causing rotation of the actuating member said means connecting said bent end to said arm, coupling said bent end and arm for mutual displacement in a plane perpendicular to the axis of said control shaft such that rotation of said shaft causes the axial displacement of said actuating rod.

2. A control as claimed in claim 1 wherein said means comprises universal coupling means connected to said arm.

3. A control as claimed in claim 2 wherein said operative members comprise a cylinder and piston combination, said piston being coupled to a source of a pneumatic pressure medium through said valves and stems, the piston being displaceable with one of said valves being actuated, said piston being coupled to said lever for actuating the same.

4. A control as claimed in claim 3 wherein said means includes a further arm, and a hinge connecting said lever to said further arm and enabling the rotation of said further arm relative to said lever about an axis parallel to the actuating rod.

5. A control as claimed in claim 4 further comprising joint means in said actuating member dividing the same into first and second portions, and further joint means in said control shaft dividing the same into first and second portions, each of said joint means rigidly coupling in detachable manner corresponding first and second portions.

6. A control as claimed in claim 1 comprising coupling means connecting said arm and said shaft, the latter said coupling means rigidly connecting said arm and shaft for rotation, while permitting limited relative axial displacements therebetween.

References Cited in the file of this patent

UNITED STATES PATENTS

| | | |
|---|---|---|
| 2,222,913 | Pescara | Nov. 26, 1940 |
| 2,235,943 | Mylius | Mar. 25, 1941 |
| 2,241,071 | Price | May 6, 1941 |
| 2,262,233 | Hey | Nov. 11, 1941 |
| 2,292,325 | Lauler | Aug. 4, 1942 |
| 2,426,722 | Baade | Sept. 2, 1947 |
| 2,520,734 | Price | Aug. 29, 1950 |